United States Patent
Tripp

(10) Patent No.: US 8,014,029 B2
(45) Date of Patent: Sep. 6, 2011

(54) RASTER-TO-SWATH IMAGE DATA CONVERSION PRINTING SYSTEM AND RELATED METHOD

(75) Inventor: Donald A. Tripp, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 593 days.

(21) Appl. No.: 12/193,843

(22) Filed: Aug. 19, 2008

(65) Prior Publication Data

US 2010/0046011 A1  Feb. 25, 2010

(51) Int. Cl.
*G06F 1/00* (2006.01)
(52) U.S. Cl. .......... 358/1.9; 358/1.2; 358/530; 358/448; 358/1.18; 382/296
(58) Field of Classification Search ............ 358/1.2–1.9, 358/530, 448, 1.18; 382/296
See application file for complete search history.

(56) References Cited

U.S. PATENT DOCUMENTS

| 5,323,245 | A | * | 6/1994 | Rylander | ............... | 358/536 |
| 5,583,660 | A | * | 12/1996 | Rylander | ............... | 358/3.17 |
| 6,785,428 | B1 | * | 8/2004 | Stolin | ............... | 382/295 |
| 7,042,589 | B2 | | 5/2006 | Vives et al. | | |
| 2007/0285445 | A1 | | 12/2007 | Li | | |
| 2010/0119120 | A1 | * | 5/2010 | Bronstein et al. | ............... | 382/113 |

* cited by examiner

*Primary Examiner* — Chan Park
(74) *Attorney, Agent, or Firm* — Donna P. Suchy

(57) ABSTRACT

A printing system for printing an image swath by swath according to image data that is provided to an image memory buffer in raster format. The printing system includes a carriage that moves a printhead with a plurality of columnar marking elements based on input provided by an encoder and a printer controller for reformatting the image data and controlling the marking elements. The printer controller includes a direct memory access controller for extracting the data from the image memory buffer and rotating the data from raster format to column format, a plurality of stroke buffers for receiving image data in column format from the direct memory access controller, an encoder control portion for providing stroke firing strobes based on input from the encoder, and a printhead driver control portion for generating data requests from the stroke buffers based on input provided by the encoder and to provide signals necessary to cause the marking elements to print according to the timing of the stroke firing strobes.

20 Claims, 12 Drawing Sheets

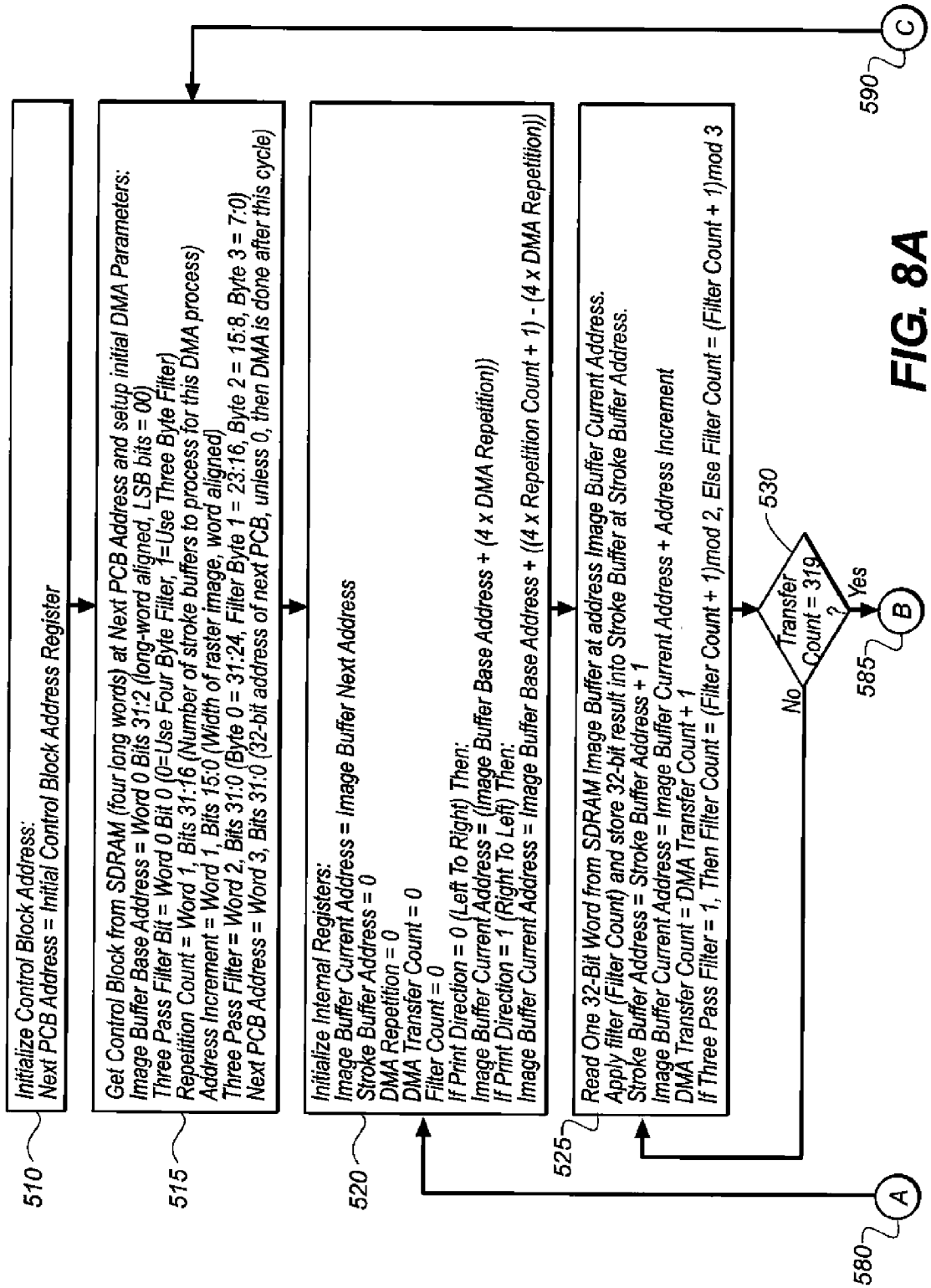

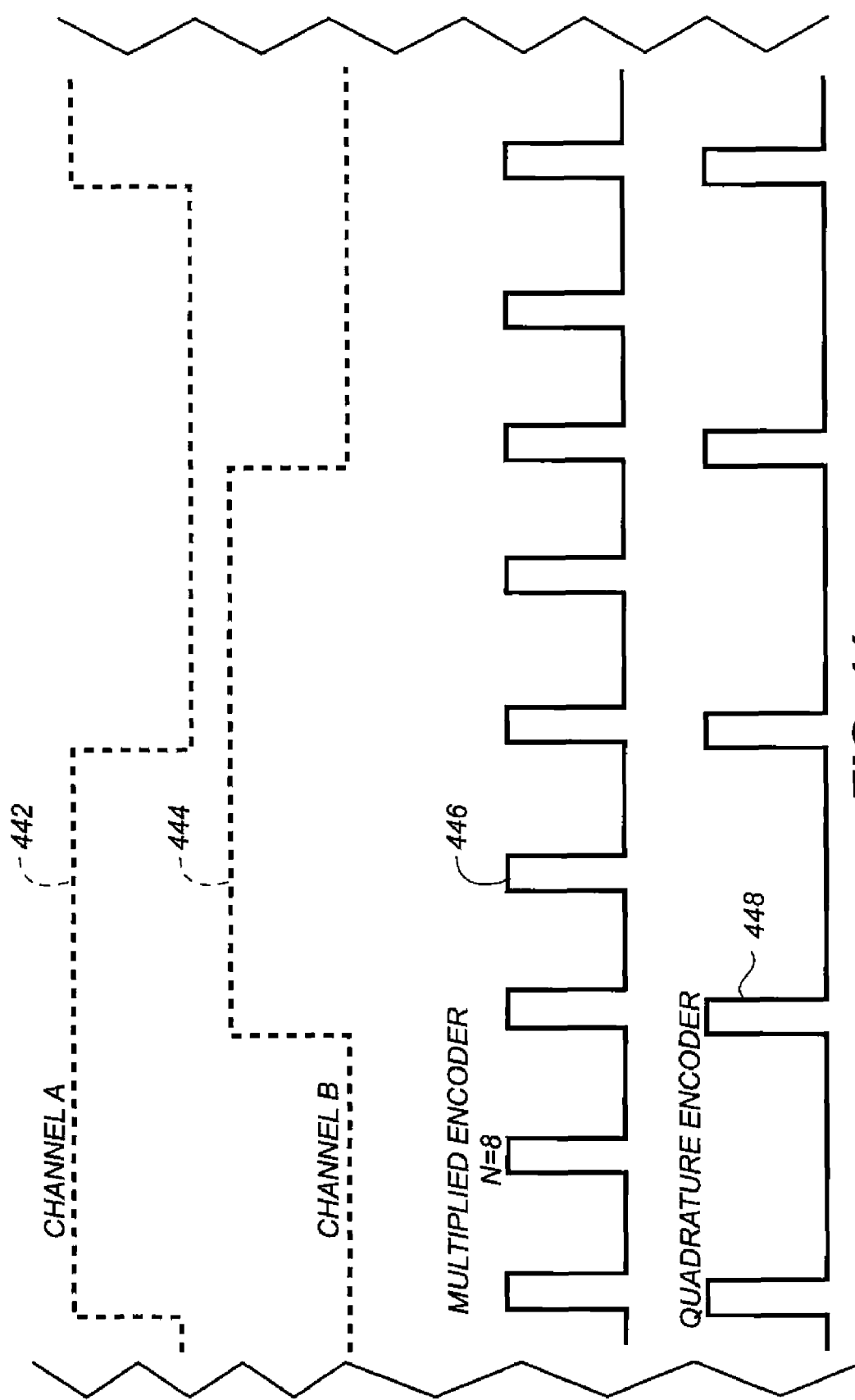

RASTER-TO-SWATH IMAGE DATA CONVERSION PRINTING SYSTEM AND RELATED METHOD

FIELD OF THE INVENTION

The present invention relates generally to image data for carriage printers, and more particularly to the reformatting of image data from raster line format to column format for printing the image swath by swath.

BACKGROUND OF THE INVENTION

Image data for printing is typically provided as a series of horizontal lines of data, or rasters. Such a format makes the image compatible with displaying on a CRT, for example, where an electron beam forms the image line by line. Raster format is also compatible with printing systems that print line by line, such as laser printers, or printers using printheads that span the entire width of the media to be printed on.

In a carriage printer there are typically one or more printheads that contain arrays of marking elements. Printheads in a carriage printer do not span the entire width of the media. Instead, the printhead is moved in a carriage scan direction while the marking elements are controlled to print a swath of image data. Then the media is advanced in a media advance direction, which is substantially perpendicular to the carriage advance direction, and another swath of image data is printed. Thus the image is printed swath by swath in a carriage printer.

Staggered arrays are well-known for inkjet printheads, with an ink feed channel being located between the two columns of marking elements. Numbered sequentially, the odd-numbered marking elements are located in one column of the array and the even numbered marking elements are located in the other column of the array. Image data is provided in raster format, i.e. line by line of 1's and 0's (where 1 means print and 0 means do not print in particular pixel locations on the media). However, the data that is needed at any given instant in time is whether or not each individual marking element in the array should make a mark on the media when the elements are located near the corresponding pixel locations on the media at that instant in time.

Since the image in a carriage printer is printed swath by swath, rather than raster line by raster line, the image data needs to be reformatted. Because the data needs to be provided as columns rather than as sequential raster lines and because of the offset distance between columns within a staggered array, at any given instant in time, the marking data for the odd numbered marking elements is from a first column of image data, and the marking data needed for the even numbered marking elements is from a second column of image data that is offset from the first column of image data by a number of pixels corresponding to the offset distance between columns of marking elements.

In addition, depending on the marking technology, it may not be possible to have all marking elements making marks at the same time. For example, in a thermal ink jet carriage printer, a typical array of marking elements may include several hundred drop ejectors for a single color. Not only would this require excessive simultaneous electrical current draw, but also fluidic crosstalk effects on drop ejectors near the jets being fired make it desirable to provide a firing order that fires groups of jets at a time, where sequentially fired jets or groups of jets are not adjacent to one another. At any given instant in time, it is necessary to provide the printhead with the data for firing the members of the group being fired next, so not only does the image data need to be provided in columns (or offset columns as described above) rather than in raster lines, but also the data within the columns needs to be shuffled in order to accommodate the firing order.

Printers for printing color images typically have marking element arrays for printing four (cyan, magenta, yellow and black) or more different colors. Image data for color printers is organized as color planes in memory. However, the marking element arrays for different colors are offset from one another, typically along the carriage scan direction. In other words a marking element in a nozzle array for one color will arrive at a position for printing a pixel in a given location at a different time than the corresponding marking element in a nozzle array for a different color would arrive at the position. Thus the data for the different color planes must also be appropriately timed such that offset between marking element arrays for different colors is properly accommodated.

In summary:
the data for each color plane must be rotated from horizontal raster lines to vertical column segments in memory;
data must be shuffled in memory to compensate for the firing order of the marking elements; and
offsets between columns of marking elements (for the same color or different colors) must be compensated for.

In prior art carriage printers, the reformatting of the incoming raster data is performed in multiple successive steps to reformat the data into vertical image column segments with the proper offsets and firing order, the image data being padded with zeroes in memory to compensate for the spatial offsets between columns of marking elements. This requires both processing power and memory to perform the reorganization of the image data.

What is needed therefore to improve the time efficiency and memory efficiency, particularly for high speed, high resolution, and low cost carriage printers is a method and apparatus for converting raster image data to swath image data for a carriage printer without requiring preprocessing of the image data.

SUMMARY OF THE INVENTION

The present invention provides a printing system and related method for printing an image swath by swath according to image data that is provided to an image memory buffer in raster format. The printing system includes a carriage that moves a printhead with a plurality of columns of marking elements based on input provided by an encoder and a printer controller for reformatting the image data and controlling the marking elements. Each column is disposed along an array direction and is spaced apart by an offset distance. The encoder provides input on the location of the carriage along the carriage scan direction that is substantially perpendicular to the array direction. A printer controller reformats the image data that is provided to an image memory buffer in raster format and controls the marking elements to print a swath of an image as the printhead is moved by the carriage in the carriage scan direction.

The printer controller includes a direct memory access controller portion for extracting data from the image memory buffer and rotating the data from raster format to column format, a plurality of stroke buffers for receiving image data in column format from the direct memory access controller, an encoder control portion for providing stroke firing strobe signals based on input from the encoder, and a printhead driver control portion for generating data requests from the stroke buffers based on input provided by the encoder and providing signals necessary to cause the marking elements to print according to the timing of the stroke firing strobe signals.

BRIEF DESCRIPTION OF THE DRAWINGS

FIGS. 8A and 8B show a flow diagram for an embodiment of the invention.

FIG. 11 shows encoder signals, as well as the quadrature encoder pulse train and the multiplied encoder pulses.

DETAILED DESCRIPTION OF THE INVENTION

Figure 1:
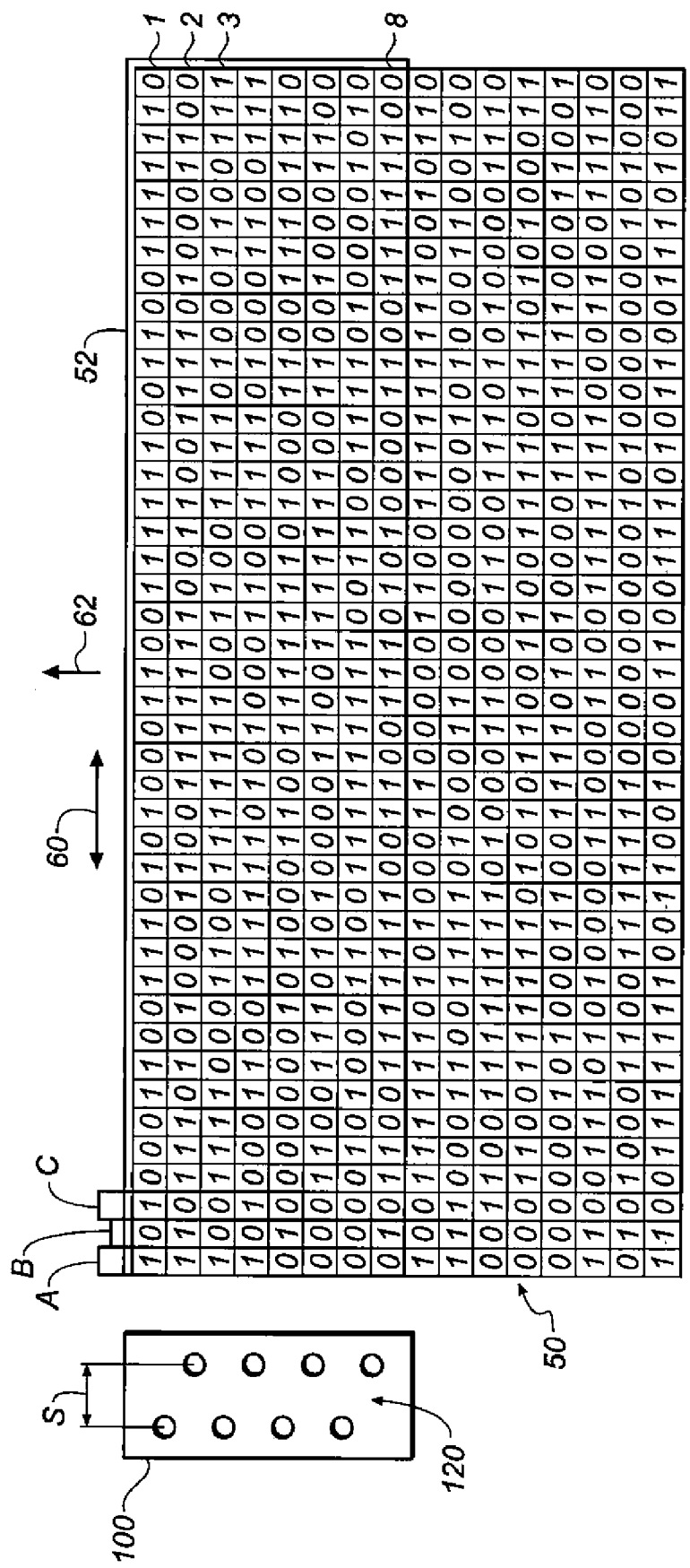
FIG. 1 schematically illustrates image data in the incoming raster data format and the required column format for swath printing.

FIG. 1 schematically illustrates image data 50 which is supplied to a printhead 100 for printing an image. The printhead in FIG. 1 is moved in a carriage scan direction 60 while the marking elements are controlled to print a swath of image data. Then the media is advanced in a media advance direction 62, which is substantially perpendicular to the carriage advance direction, and another swath of image data is printed. Thus the image is printed swath by swath in a carriage printer.

In FIG. 1, printhead 100 includes 8 marking elements, for example ink jet drop ejectors, in marking element array 120. Other marking elements are compatible with the raster-to-swath image data conversion printing system and related method including light sources and emitters, heaters, magnetic elements and similar devices used as marking elements in a printing system or similar device. The present array 120 is arranged as a staggered array with alternate marking elements arranged in two columns which are spaced apart by a distance s. The offset distance s may be expressed as a number of pixel spacings. Thus if the printing resolution is 1200 pixel spacings per inch in the carriage scan direction and if the offset distance s between columns is $\frac{1}{120}$ inch, for example, s could also be expressed as 10 pixel spacings. Such staggered arrays are well-known for inkjet printheads, with an ink feed channel (not shown) being located between the two columns. Numbered sequentially, the odd-numbered marking elements are located in one column of array 120 and the even numbered marking elements are located in the other column of array 120. Image data 50 is provided in raster format, i.e. line by line of 1's and 0's (where 1 means print and 0 means do not print in particular pixel locations on the media) for raster lines 1, 2, 3, . . . . However, the data that is needed at any given instant in time is whether or not each individual marking element in array 120 should make a mark on the media when the elements are located near the corresponding pixel locations on the media at that instant in time.

Since the image in a carriage printer is printed swath by swath, rather than raster line by raster line, the image data needs to be reformatted. In the example of FIG. 1, the data needs to be provided as columns rather than as sequential raster lines. Moreover, because of the offset s within staggered array 120, at any given instant in time, the marking data for the odd numbered marking elements is from a first column (A, B, C . . . ) of image data, and the marking data needed for the even numbered marking elements is from a second column of image data that is offset from the first column by a number of pixels corresponding to the offset distances. FIG. 1 shows a swath 52 of image data that the printhead will need for printing the corresponding image as the printhead is scanned along the carriage direction 60. Swath 52 in FIG. 1 includes the same number of rows of data as there are marking elements in array 120.

Note that FIG. 1 represents image data for a single color but is representative of one color in a multicolor print head. Printers for printing color images typically have marking element arrays for printing four (cyan, magenta, yellow and black) or more different colors. Image data for color printers is organized as color planes in memory. In other words, in the same way that the rows and columns of image data 50 in FIG. 1 represent the pixel locations to be marked for printing one color of an image, a different plane of image data (not shown) would have rows and columns of data representing which pixel locations are to be printed with another color for that same image. However, the marking element arrays for different colors are offset from one another, typically along the carriage scan direction. In other words a marking element in a nozzle array for one color will arrive at a position for printing a pixel in a given location at a different time than the corresponding marking element in a nozzle array for a different color would arrive at the position. Thus the data for the different color planes must also be appropriately timed such that offset between marking element arrays for different colors is properly accommodated.

In summary:
  the data for each color plane must be rotated from horizontal raster lines to vertical column segments in memory;
  data must be shuffled in memory to compensate for the firing order of the marking elements; and
  offsets between columns of marking elements (for the same color or different colors) must be compensated for.

In prior art carriage printers, the reformatting of the incoming raster data is performed in multiple successive steps to reformat the data into vertical image column segments with the proper offsets and firing order, the image data being padded with zeroes in memory to compensate for the physical offsets between columns of marking elements. This requires both processing power and memory to perform the reorganization of the image data.

Figure 2:
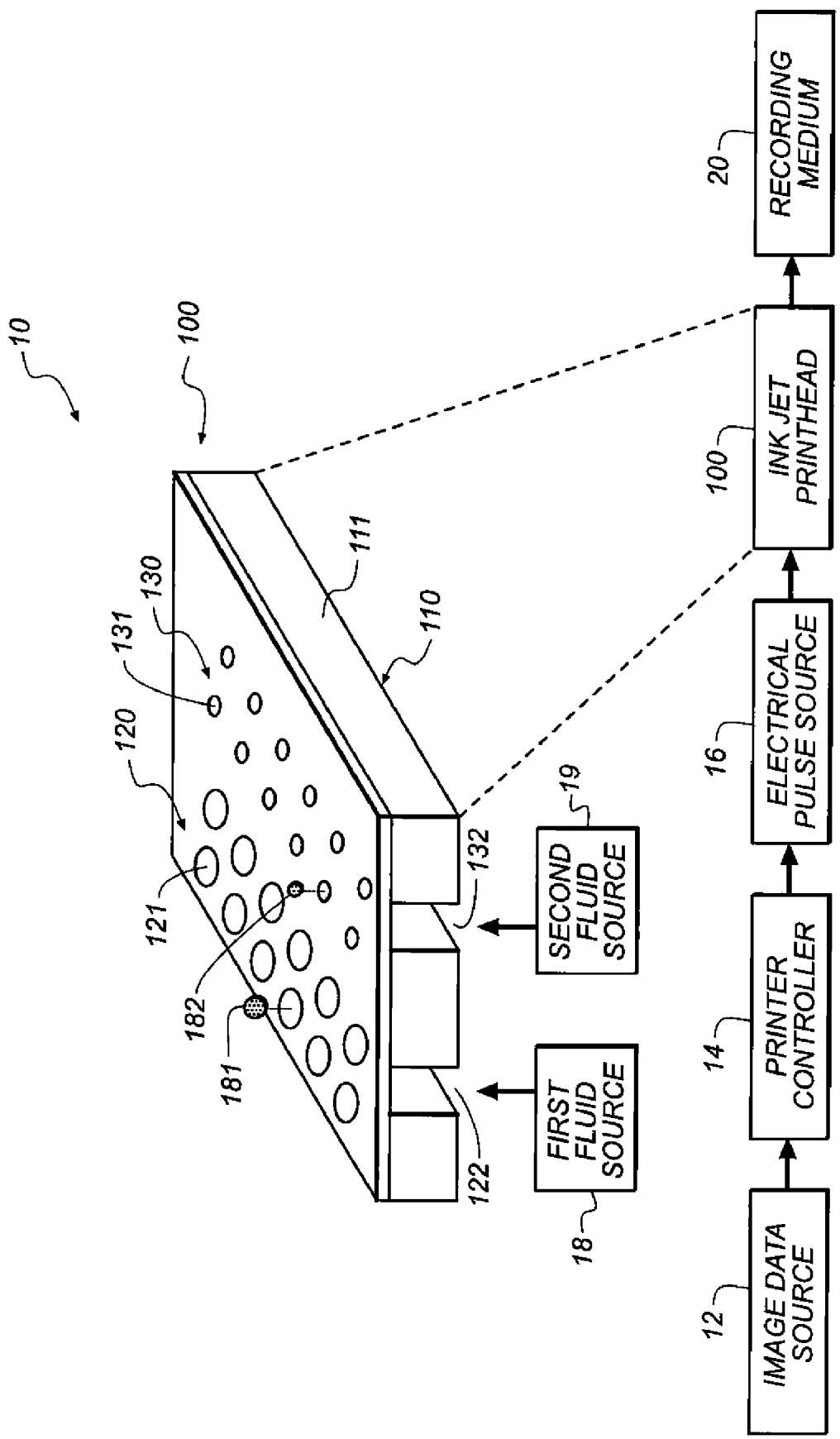
FIG. 2 is a schematic representation of an inkjet printer system.

Referring to FIG. 2, a schematic representation of an inkjet printer system 10 is shown, as described in U.S. Pat. No. 7,350,902. The system includes a source 12 of image data (such as raster image data 50 of FIG. 1) which provides signals that are interpreted by a printer controller 14 as being commands to eject drops. (Note: printer controller 14 has many functions in controlling the operation of the printer, including processing of image data. Included in printer controller 14 are other controllers that control particular functions, as will be described below.) Printer controller 14 reformats the image data as needed for the printing, and outputs signals to a source 16 of electrical energy pulses that are inputted to the inkjet printhead 100 which includes at least one printhead die 110. In the example shown in FIG. 2, there are two nozzle arrays. Nozzles 121 in the first nozzle array 120 have a larger opening area than nozzles 131 in the second nozzle array 130. In this example, each of the two nozzle arrays has two staggered columns of nozzles, each column having a nozzle density of 600 per inch. The effective nozzle density then in each array is 1200 per inch.

If pixels on the recording medium were sequentially numbered along the paper advance direction 62, the nozzles from one column (the odd nozzle column) of an array would print the odd numbered pixels, while the nozzles from the other column (the even nozzle column) of the array would print the even numbered pixels. In fluid communication with each nozzle array is a corresponding ink delivery pathway. Ink delivery pathway 122 is in fluid communication with nozzle array 120, and ink delivery pathway 132 is in fluid communication with nozzle array 130. Portions of fluid delivery pathways 122 and 132 are shown in FIG. 2 as openings through printhead die substrate 111. One or more printhead die 110 will be included in inkjet printhead 100, but only one printhead die 110 is shown in FIG. 2. The printhead die are arranged on a support member as discussed below relative to FIG. 3. In FIG. 2, first ink source 18 supplies ink to first nozzle array 120 via ink delivery pathway 122, and second ink source 19 supplies ink to second nozzle array 130 via ink delivery pathway 132. Although distinct ink sources 18 and 19 are shown, in some applications it may be beneficial to have a single ink source supplying ink to nozzle arrays 120 and 130 via ink delivery pathways 122 and 132 respectively. Also, in some embodiments, fewer than two or more than two nozzle arrays may be included on printhead die 110. In some embodiments, all nozzles on a printhead die 110 may be the same size, rather than having multiple sized nozzles on a printhead die.

Not shown in FIG. 2 are the drop-forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bilayer element) and thereby cause ejection.

In any case, electrical pulses from pulse source 16 are sent to the various drop ejectors according to the desired deposition pattern. In the example of FIG. 2, droplets 181 ejected from nozzle array 120 are larger than droplets 182 ejected from nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops.

During operation, droplets of ink are deposited on a recording medium 20. Not all drop ejectors in the nozzle array (especially for thermal inkjet) can be fired simultaneously, so that for an array having two columns of nozzles, each column having 320 nozzles (i.e. 320 jets), sixteen groups of twenty jets each would be fired sequentially. Because of fluidic crosstalk considerations, the twenty jets in one group would typically not be neighboring jets in the next group of twenty jets to be fired. In one embodiment, the first group of jets to be fired in the odd nozzle column would be 1, 33, 65, . . . 609, while the second group of jets to be fired would be 5, 37, 69, . . . 613. In such an embodiment, the data would need to be shuffled for correct firing order. By contrast, if the first group of jets to be fired in the odd nozzle column were 1, 3, 5, . . . 31, and the second group of jets to be fired in the odd nozzle column were 33, 35, 37, . . . 63 (etc.), then shuffling for firing order within the column would not be required.

The firing pattern is sometimes called a ripple pattern, and the image data needs to be formatted to be compatible with the ripple firing order of the jets. Each column is divided into ripple primitives of "k" nozzles. A ripple address block consists of "k" nozzles in a given column, each occupying a like offset within a unique primitive. Firing of all of the jets in an array (e.g. the sixteen groups of twenty jets in each of the two columns of the array) is called a stroke firing. Each stroke consists of loading data for and firing each address block in a ripple order that is the firing ripple address sequence for a particular column. The ripple orders of the columns within a pair of columns in an array may differ. A single dedicated image data line and a single firing enable line can be provided for each color column pair. In a preferred embodiment, logic circuitry, such as one or more shift registers, is integrated into the printhead 100, so that serial data provided by the image data line is sequentially shifted to control the firing of the jets. An intent of the present invention is to provide serial data in the correct order for printing.

Figure 3:
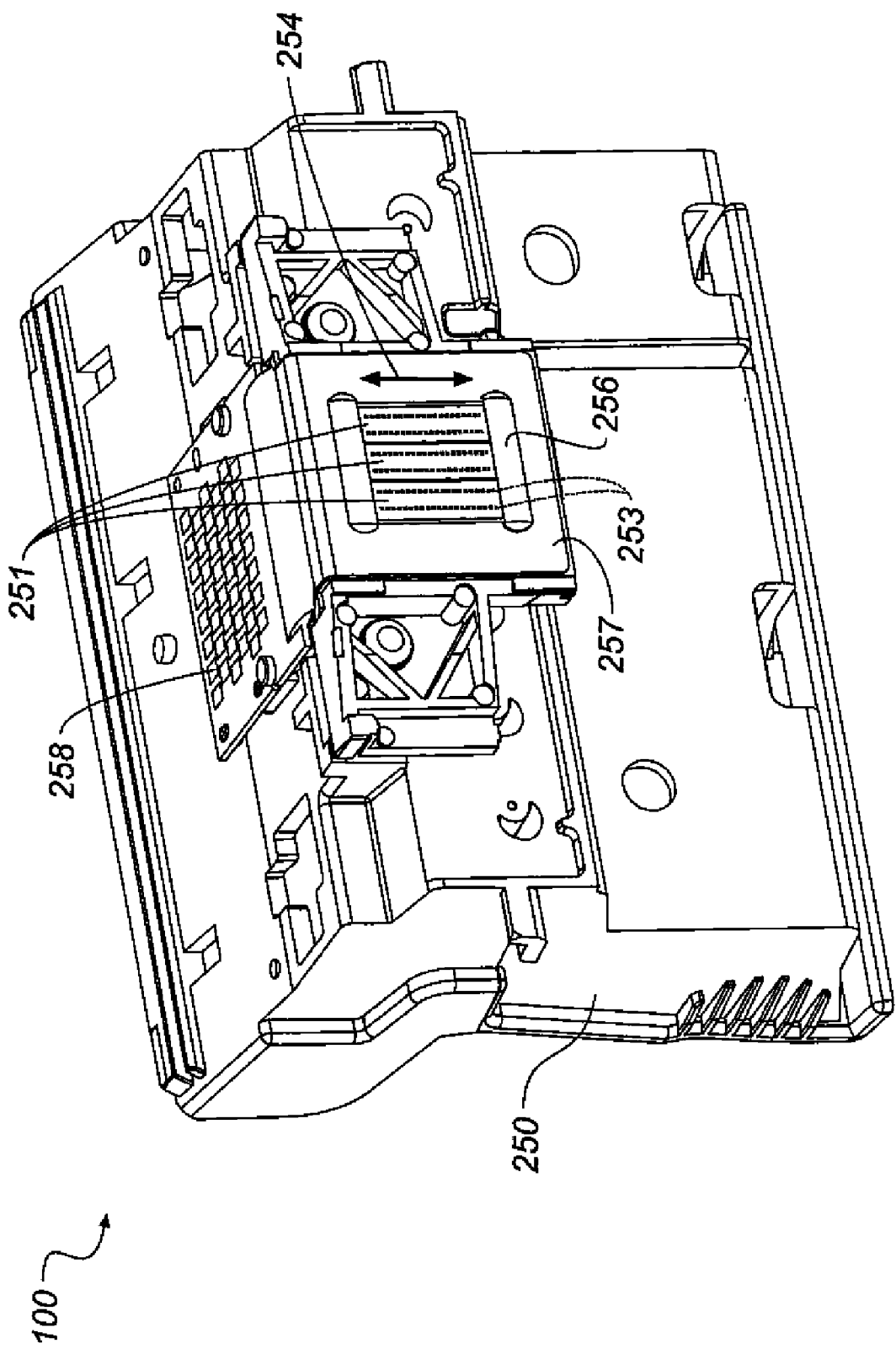
FIG. 3 is a perspective view of a portion of a printhead chassis.

FIG. 3 shows a perspective view of a portion of a printhead chassis 250, which is an example of an inkjet printhead 100. Printhead chassis 250 includes three printhead die 251 (similar to printhead die 110), each printhead die containing two nozzle arrays 253, so that printhead chassis 250 contains six nozzle arrays 253 altogether. The six nozzle arrays 253 in this example may be each connected to separate ink sources (not shown in FIG. 3), such as cyan, magenta, yellow, text black, photo black, and a colorless protective printing fluid. Each array of jets corresponds to a channel, so there is a yellow channel, a cyan channel, etc.

Figure 4:
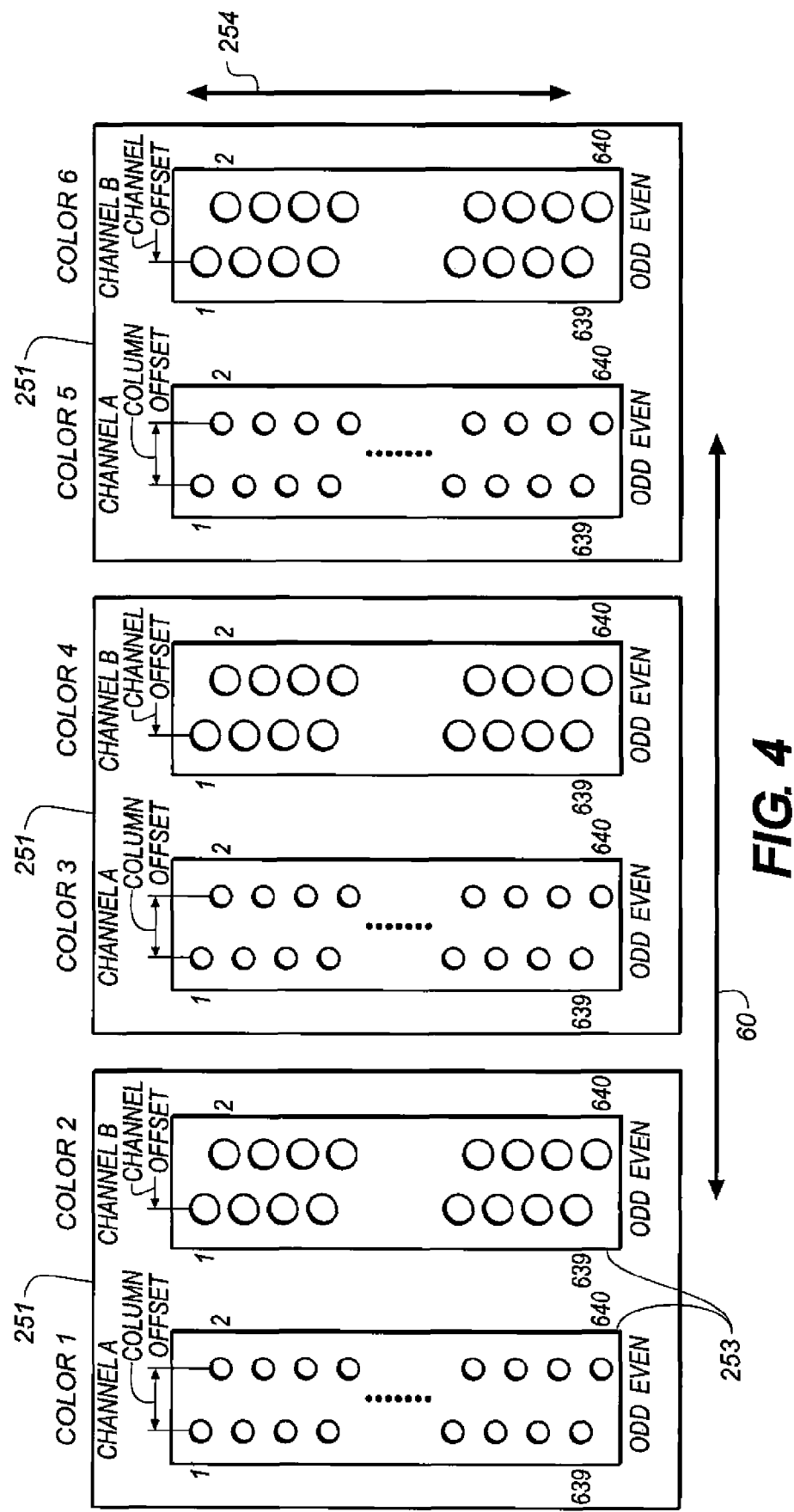
FIG. 4 is close-up view of the nozzle layout in a printhead

FIG. 4 schematically shows the three die 251 of FIG. 3 in a close-up view. In FIGS. 3 and 4, the arrays of nozzles are shown as being disposed as straight lines along array direction 254. In some embodiments, the nozzles in the columns of an array are not exactly on straight lines, but may have a sawtooth arrangement. However the amplitude of the sawtooth is typically small compared to the length of the array along array direction 254, so that nozzles in the column are arranged in a substantially straight line. Printhead chassis 250 is mounted in carriage 200 in an orientation such that array direction 254 is substantially parallel to media advance direction 62 and substantially perpendicular to carriage scan direction 60.

The distance between the column of odd-numbered nozzles and the column of even numbered nozzles in nozzle array 253 will be called the column offset herein. The distance between corresponding nozzles (such as nozzle 1) in adjacent nozzle arrays 253 will be called the channel offset herein. The channel offset within a die 251 (i.e. the intra-die channel offset) can be different from the channel offset between adjacent nozzle arrays 253 on adjacent die 251 (i.e. the inter-die channel offset). Typically the channel offsets are larger than the column offsets. All offset distances must be properly accounted for during the respective timing of firing of the nozzle arrays 253 in order to provide registration of the dots being printed by the different color nozzle arrays 253.

Each of the six nozzle arrays 253 is disposed along array direction 254, and the length of each nozzle array along direction 254 is typically on the order of 1 inch or less. Typical lengths of recording media are 6 inches for photographic prints (4 inches by 6 inches), or 11 inches for 8.5 by 11 inch paper. Thus, in order to print the full image, a number of swaths are successively printed while moving printhead chassis 250 across the recording medium (corresponding to carriage scan direction 60 of FIG. 1). Following the printing of a swath, the recording medium is advanced (corresponding to media advance direction 62 of FIG. 1).

A single pass print mode is one in which each marking element in the array is assigned to print all of the pixel locations within a given row of pixels in a swath. Single pass print modes are relatively fast and are typically used in draft modes. However, if a jet is misdirected or malfunctioning in other ways, single pass print modes can result in objectionable white or dark streaks in the printed image. Therefore, higher quality print modes use multiple passes to print the image. In multi-pass printing, print masks are used to assign responsibility to different marking elements for printing the various printing locations within a row of pixels. In addition, the media advance distance between printing passes is less than the length of the nozzle array in multi-pass printing. Instead, if the length of the nozzle array is L and the number of passes in the multi-pass print is M, then the media advance distance will be approximately L/M.

Also shown in FIG. 3 is a flex circuit 257 to which the printhead die 251 are electrically interconnected, for example by wire bonding or TAB bonding. The interconnections are covered by an encapsulant 256 to protect them. Flex circuit 257 bends around the side of printhead chassis 250 and connects to connector board 258. When printhead chassis 250 is mounted into the carriage 200 (see FIG. 5), connector board 258 is electrically connected to a connector (not shown) on the carriage 200, so that electrical signals may be transmitted to the printhead die 251.

Figure 5:
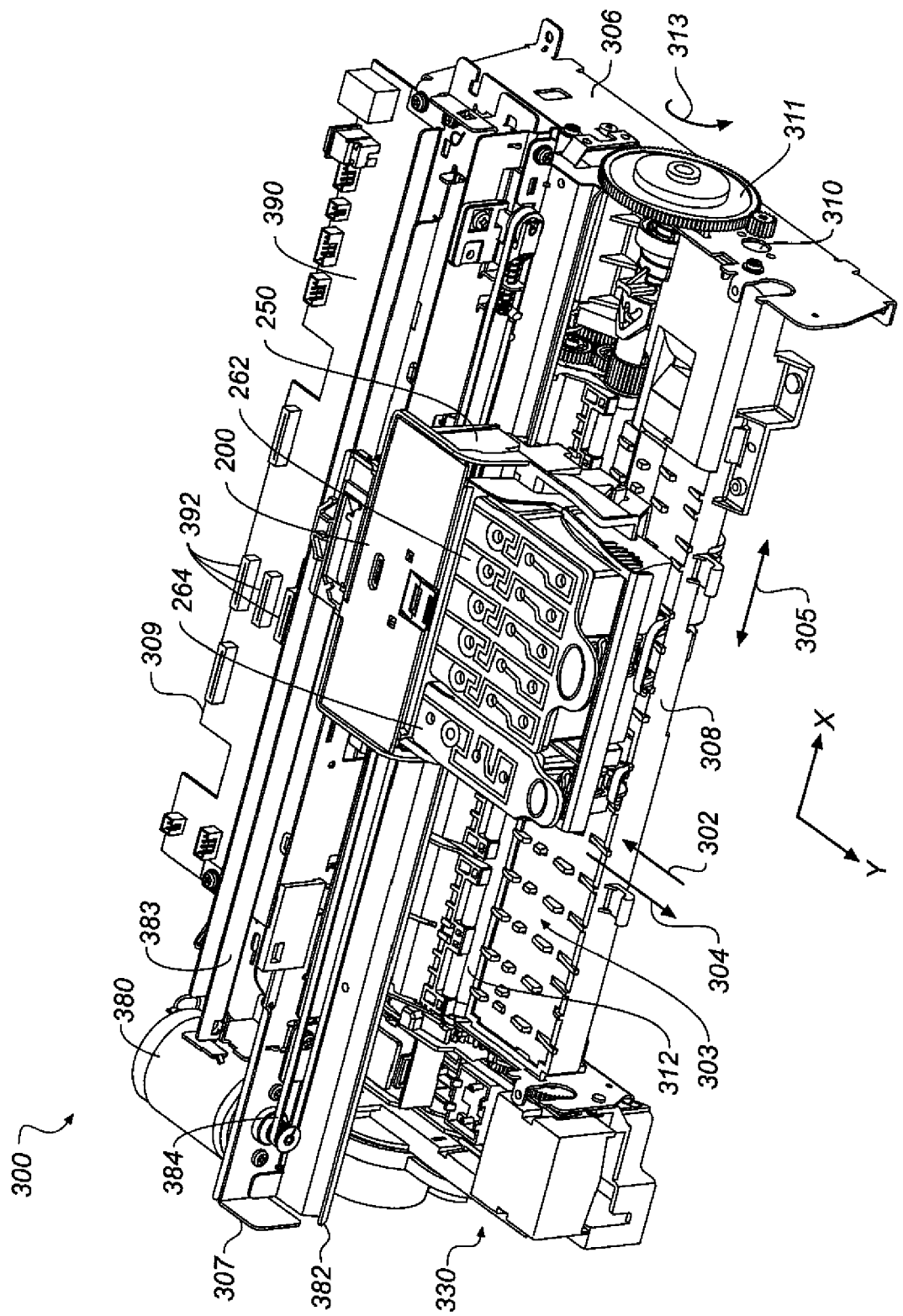
FIG. 5 is a perspective view of a portion of a carriage printer.

FIG. 5 shows a portion of a carriage printer. Some of the parts of the printer have been hidden in the view shown in FIG. 5 so that other parts may be more clearly seen. Printer chassis 300 has a print region 303 across which carriage 200 is moved back and forth 305 along the X axis (corresponding to carriage scan direction 60 in FIG. 1) between the right side 306 and the left side 307 of printer chassis 300 while printing. Carriage motor 380 moves belt 384 to move carriage 200 back and forth along carriage guide rail 382. An encoder sensor (not shown) is mounted on carriage 200 and indicates carriage location relative to an encoder fence 383 graduated, for example into 150 lines per inch. Printhead chassis 250 is mounted in carriage 200, and ink supplies 262 and 264 are mounted in the printhead chassis 250. The mounting orientation of printhead chassis 250 is rotated relative to the view in FIG. 3, so that the printhead die 251 are located at the bottom side of printhead chassis 250, the droplets of ink being ejected downward onto the recording media in print region 303 in the view of FIG. 5. Ink supply 262, in this example, contains five ink sources cyan, magenta, yellow, photo black, and colorless protective fluid, while ink supply 264 contains the ink source for text black.

Figure 6:
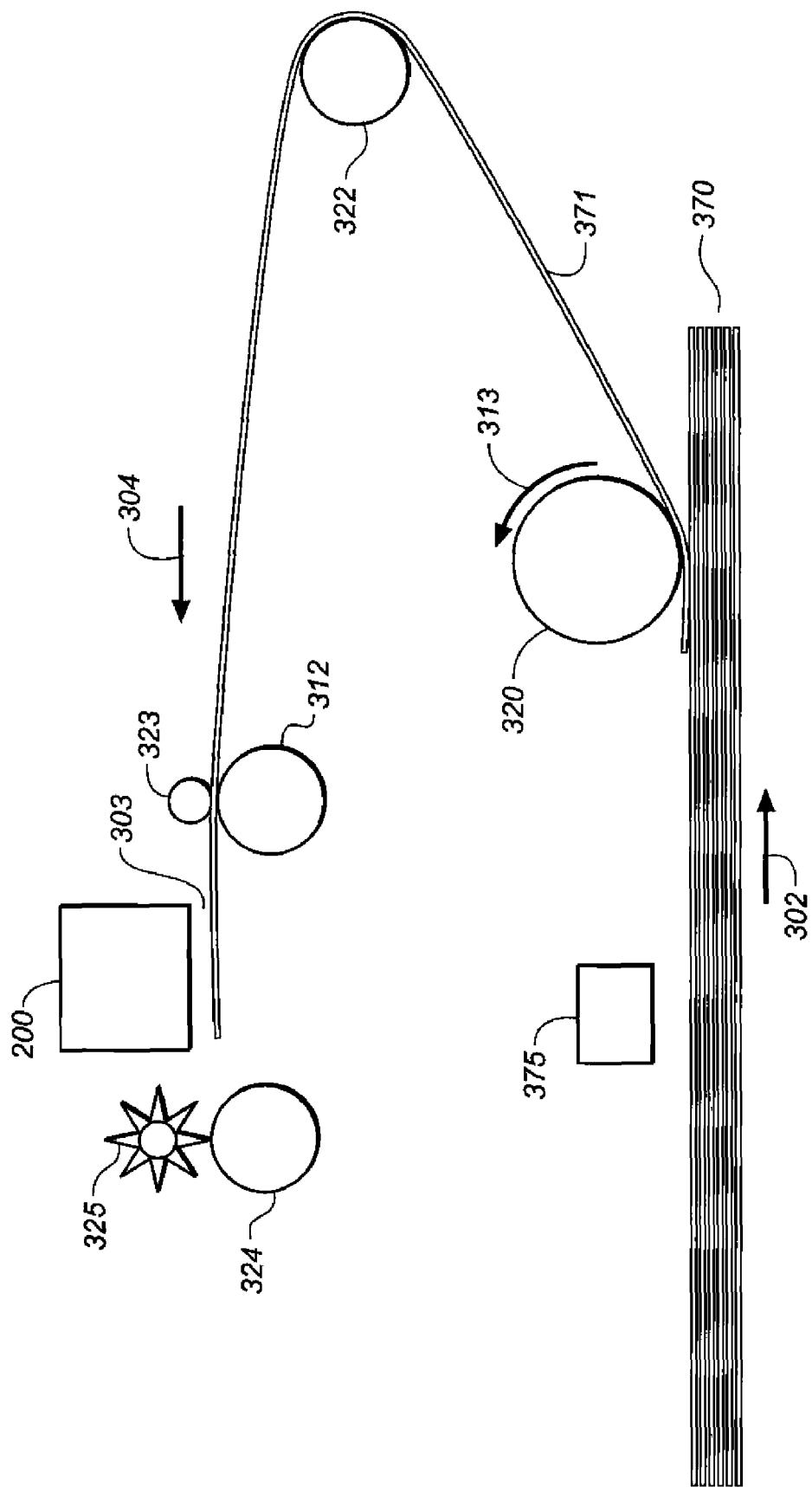
FIG. 6 is a schematic side view of a paper path in a carriage printer.

Paper, or other recording media (sometimes generically referred to as paper herein) is loaded along paper load entry direction 302 toward the front 308 of printer chassis 300. A variety of rollers are used to advance the medium through the printer, as shown schematically in the side view of FIG. 6. In this example, a pickup roller 320 moves the top sheet 371 of a stack 370 of paper or other recording media in the direction of arrow 302. A turn roller 322 toward the rear 309 of the printer chassis 300 acts to move the paper around a C-shaped path (in cooperation with a curved rear wall surface) so that the paper continues to advance along direction arrow 304 from the rear 309 of the printer. The paper is then moved by feed roller 312 and idler roller(s) 323 to advance along the Y axis across print region 303, and from there to a discharge roller 324 and star wheel(s) 325 so that printed paper exits along direction 304. Feed roller 312 includes a feed roller shaft 319 along its axis, and feed roller gear 311 is mounted on the feed roller shaft 319. Feed roller 312 may consist of a separate roller mounted on feed roller shaft 319, or may consist of a thin high friction coating on feed roller shaft 319.

The motor that powers the paper advance rollers is not shown in FIG. 5, but the hole 310 at the right side 306 of the printer chassis 300 is where the motor gear (not shown) protrudes through in order to engage feed roller gear 311, as well as the gear for the discharge roller (not shown). For normal paper pick-up and feeding, it is desired that all rollers rotate in forward direction 313. Toward the left side 307 in the example of FIG. 5 is the maintenance station 330. Toward the rear 309 of the printer in this example is located the electronics board 390, which contains cable connectors 392 for communicating via cables (not shown) to the printhead carriage 200 and from there to the printhead. Also on the electronics board are typically mounted motor controllers for the carriage motor 380 and for the paper advance motor, a processor and/or other control electronics for controlling the printing process (i.e. hardware for printer controller 14), and an optional connector for a cable to a host computer.

As described above relative to FIG. 4, image data must be presented to each print head odd/even color column in vertical color stroke segments with the proper horizontal offsets. The problem with this organization is that it is contrary to the standard way in which color images are stored in memory in raster planar organization. A purpose of the present invention is to use a Direct Memory Access Controller to perform direct memory moves of multi-planar horizontal raster formatted image data to vertically organized stroke buffers with data that can be directly output to the printhead by the under the firing synchronization of an Encoder Module. The column segments of data that are provided to the printhead are generally not for contiguous groups of nozzles in the column of nozzles in the array, but rather the column segments of data are shuffled for the correct firing order.

An embodiment of the invention described herein (where each array of marking elements includes two offset columns of 320 inkjet drop ejectors), incorporates a programmable automated mechanism for printing multi-planar raster images under Direct-Memory-Access (DMA) while performing raster-to-column data conversion, odd-even column offsetting, left-right margin control, multi-pass masking support and providing for programmable ripple address jet firing order within a stroke. This is accomplished with the following functional modules included in printer controller 14:

Raster-To-Column DMA Controller: An N channel Raster-To-Column DMA Controller is required to support printing of multi-planar (N planes, where N=6 in the example shown in FIG. 4) raster images stored in SDRAM in their native format. As operation of each color channel is identical, we will describe only a single color channel consisting of 320 odd jets and 320 even jets. The DMA Controller extracts image data from memory and stores it into vertical stroke buffers using a novel "scatter gather" algorithm. A scatter/gather algorithm is a method of input and output by which a single instruction sequentially writes data from multiple buffers to a single data stream or reads data from a data stream to multiple buffers. Scatter/gather refers to the process of gathering data from, or scattering data into, the given set of buffers. An aspect of the present scatter/gather algorithm that is different from generic scatter/gather algorithms is the rotation of data from raster format to a vertical column format using stroke buffers.

Image Memory Buffer: An Image Memory Buffer (also called an Image Data Buffer herein) provides the image data to fire during printing operations. The Raster-To-Column DMA Controller interfaces directly to this Image Memory Buffer. The size and starting address of the image data for any given print operation is programmable. For printing applications, the programmable Raster-To-Column DMA controller extracts image data from the Memory Buffer into alternating 32-bit by 320 jet stroke buffers for print head firing of multi-planar raster images without image reordering. In general, the width and depth of the Stroke Buffers should correspond to the natural width of the printer's image memory subsystem and the vertical height in pixels of the inkjet printhead (320 in this embodiment).

Stroke Buffers Each print head die color odd/even nozzle column is driven with data from 32-bit by 320-jet stroke buffers in an alternating (ping-pong) output fashion. Two of these stroke buffers are assigned to odd jets and two to even jets. These stroke buffers can be implemented in a field programmable gate array (FPGA) and can be used as registers to fire individual or patterns of jets or used in conjunction with the Raster-To-Column DMA Controller (described above) to perform output of data from multi-planar raster images with automatic jet order lookup.

Print Head Driver Module (PHDM): The PHDM provides the signaling protocol necessary to fire the inkjet print head under the control of firing strobes issued by the Encoder Module (described below). The PHDM generates data requests for fresh stroke buffers, to the Raster-To-Column DMA Controller during printing operations. The PHDM also generates the ripple address sequence during print head firing.

Encoder Module: To support printing applications, this module provides stroke firing timing strobes to the PHDM based on a quadrature encoder input. The Encoder Module provides direct, divided and multiplied stroke firing timing modes to support a variety of printing applications. Programmable Margin Registers with independent print zones provide for automatic offset compensation for odd/even column offset as well as color column and die offsets. A carriage position tracking circuit monitors the quadrature encoder inputs for directionality and motion to support the column offset compensation functions and to provide position feedback to the printing system. Both fine and coarse margin controls are provided as well as a stroke request delay circuit for even finer adjustments.

Figure 7:
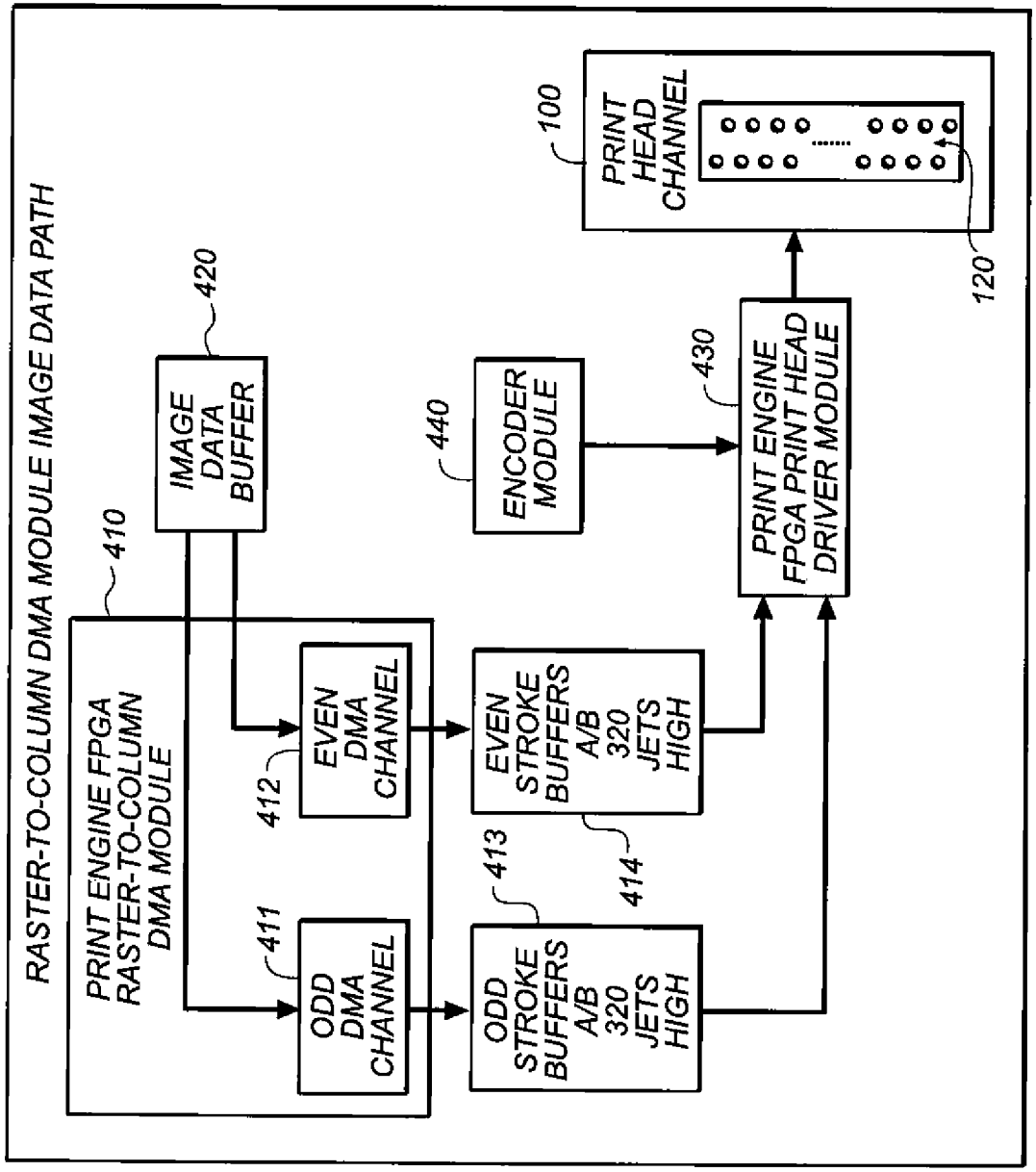
FIG. 7 shows the image data path for one color plane in an embodiment of the invention.

FIG. 7 shows the image data path for one color plane in an embodiment of the Raster-To-Column DMA Module. The Print Engine FPGA of printer controller 14 implements one Raster-To-Column DMA controller 410 for each color channel in the printhead. Each Raster-To-Column DMA controller channel includes two sub-channels, one to provide the data to the odd-numbered nozzles (odd DMA channel 411) and one to provide the data to the even numbered nozzles (even DMA channel 412). The basic data flow in the Image Data Path, when using the Raster-To-Column DMA Module 410, is as follows:

Software builds a multi-planar print swath (color planes) in the image data buffer 420.

Software defines print head nozzle ripple order for the current swath using Ripple Order Registers Software describes the swath length, height and offset parameters to the Raster-To-Column DMA Controller 410, Print Head Driver Module 430 and "print zones" to the Encoder Module 440.

Raster-To-Column DMA Controller 410 performs a raster-to-column DMA conversion from SDRAM into one of the two Odd Stroke Buffers 413A and 413B and also into one of the two Even Stroke Buffers 414A and 414B using programmed swath length and height parameters.

Print (using nozzle array 120, for example, in printhead 100) the data from the Odd/Even Stroke Buffers (e.g. 413A and 414A) using the jet order defined in the Ripple Order Registers, While printing data from one pair of Stroke Buffers (e.g. 413A and 414A), the Raster-To-Column DMA Controller 410 extracts the next pair of Stroke Buffers (e.g. 413B and 414B) for printing.

Raster-To-Column DMA operations are defined by "Printing Control Blocks" which are stored in SDRAM and define the details of the printing move to the DMA Controller The address location of the Initial Printing Control Block (IPCB) for each channel is programmed into the Raster-To-Column DMA Controller 410 using the Initial Control Block Registers. There is an Odd Initial Control Block Register (IPCB_ODD) for each Odd DMA Channel 411 and an Even Initial Control Block Register (IPCB_EVEN) for each Even DMA Channel 412. Each of these registers encodes a 32-bit address that instructs the Raster-To-Column DMA Controller 410 where to find its first Printing Control Block.

The Odd and Even Initial Control Block Register pair for a Raster-To-Column DMA Print Head Channel is shown below. To access these registers, two address offsets are mapped and the Channel Select Register is used to select the DMA Channel to read/write. In this embodiment the Address Bits [1:0] must equal 00 due to the 32-bit alignment requirement. Because all control block addresses are required to be on 32-bit boundaries address bits [1:0] will be forced to 00 regardless of what value is written to these bits.

| Initial Printing DMA Control Block Address Registers, Odd DMA Channels: | |
|---|---|
| Register Name | Bits: [31:0] |
| IPCBA_ODD | Address [31:0] of Odd Channels Initial Control Block (A[1:0] = 00) |

Address[31:0] Initial PCB address for Odd DMA Channels

| Initial Printing DMA Control Block Address Registers, Even DMA Channels: | |
|---|---|
| Register Name | Bits: [31:0] |
| IPCBA_EVEN | Address [31:0] of Even Channels Initial Control Block (A[1:0] = 00) |

Address[31:0] Initial PCB address for Even DMA Channels

The Raster-To-Column Printing DMA channels are initially started by writing a "1" to the Start/Abort bit of the Print Control (PRNT_CTRL) register. Once the Start/Abort bit is written, the channel retrieves data for the first stroke buffer for each channel (if the channels are enabled). Further stroke buffers are filled by a request for a new buffer of data from the Print Head Driver Module 430 (PHDM). A DMA moves data beginning at a given address. A scatter/gather algorithm uses control blocks to define where the DMA should get the next block of data. When an initial stroke buffer retrieval is required, the DMA channel proceeds to read the initial control block at the address specified by the above registers (dependent upon which channel is being serviced). A printing control block (PCB) contains the following information:

| Control Block Field | Relative 32-bit DWord Address, Bitfield |
| --- | --- |
| Image Buffer Base Address A(31:2) | Word 0, bits (31:2) Bits (1:0 Always = 00) |
| Three Pass Filter | Word 0, bit (0) |
| Repetition Count | Word 1, bits (27:16) |
| Address Increment | Word 1, bits (15:0) |
| Data Filter Byte 3 | Word 2, bits (7:0) |
| Data Filter Byte 2 | Word 2, bits (15:8) |
| Data Filter Byte 1 | Word 2, bits (23:16) |
| Data Filter Byte 0 | Word 2, bits (31:24) |
| Next PCB Address A(31:0) | Word 3, bits (31:0) |

Image Buffer Base Address indicates where to start looking for image data. Note that buffers must be located on 32-bit aligned addresses (least significant 2 bits of the address must be 00).

The Three Pass Filter bit indicates whether three or four filter bytes are used. If the bit is set to 1, filter bytes 0, 1 and 2 are applied in a cyclical fashion to the incoming data stream. If the bit is set to 0, all four bytes are applied. Byte 0 is applied to the first raster for the current PCB, byte 1 is applied to the second, etc. Note that application software must align the filter to the first raster in the PCB based upon paper advance, etc., as this cannot be tracked by the FPGA.

Repetition Count indicates how many 32-bit word raster segments to retrieve (32 pixel segments). This is used to indicate that less than the full width of the raster buffer will be printed (use for white space skipping). The value for this field should be one less than the number of segments desired.

Address Increment indicates how far to jump ahead in memory for each successive word. The value is based on raster length, and in fact, defines it for the DMA channel. The value indicates the number of 32-bit words that are to be skipped to get to the same place in the next raster. A value of zero indicates reuse of the same memory location (e.g. to insert a blank section in the raster).

The Data Filter words are for a 32-bit filter (composed of 4 byte-wide filters) which is applied to inbound data in a cyclic fashion. These can be used for multi-pass printing to selectively mask different image bits in each active color plane for separate image printing passes.

The Next Printing Control Block Address points to the next PCB in the chain. Again, note that the low 2 bits of the address are not used implying 4-byte aligned control blocks. The last PCB in the chain is indicated by an address of 0. As a result, no control block can be located at address 0.

Transfer Count (Not part of the PCB) indicates how many words to get via this particular control block (based on number of nozzles for this region). This value should be set to 1 less than the desired number to be transferred. For example, for a 320 nozzle inkjet printhead, this should always be set to 319, so for this embodiment, Transfer Count is fixed at 319 and is not part of the PCB.

Based on the above fields, the following physical constraints exist for the image raster buffer:

The maximum raster length is limited by the Address Increment field to 65536 pixels ($2^{16}$). At 1200 dots per inch, the maximum raster length is ≈54.6 inches.

The minimum length of a swath is limited by the Repetition Count to 32 pixels. At 1200 dots per inch this yields a minimum length of 0.0267 inches. The raster segment size (32 pixels) is also the minimum resolution at which partial raster buffer printing can be accomplished.

Figure 8B:
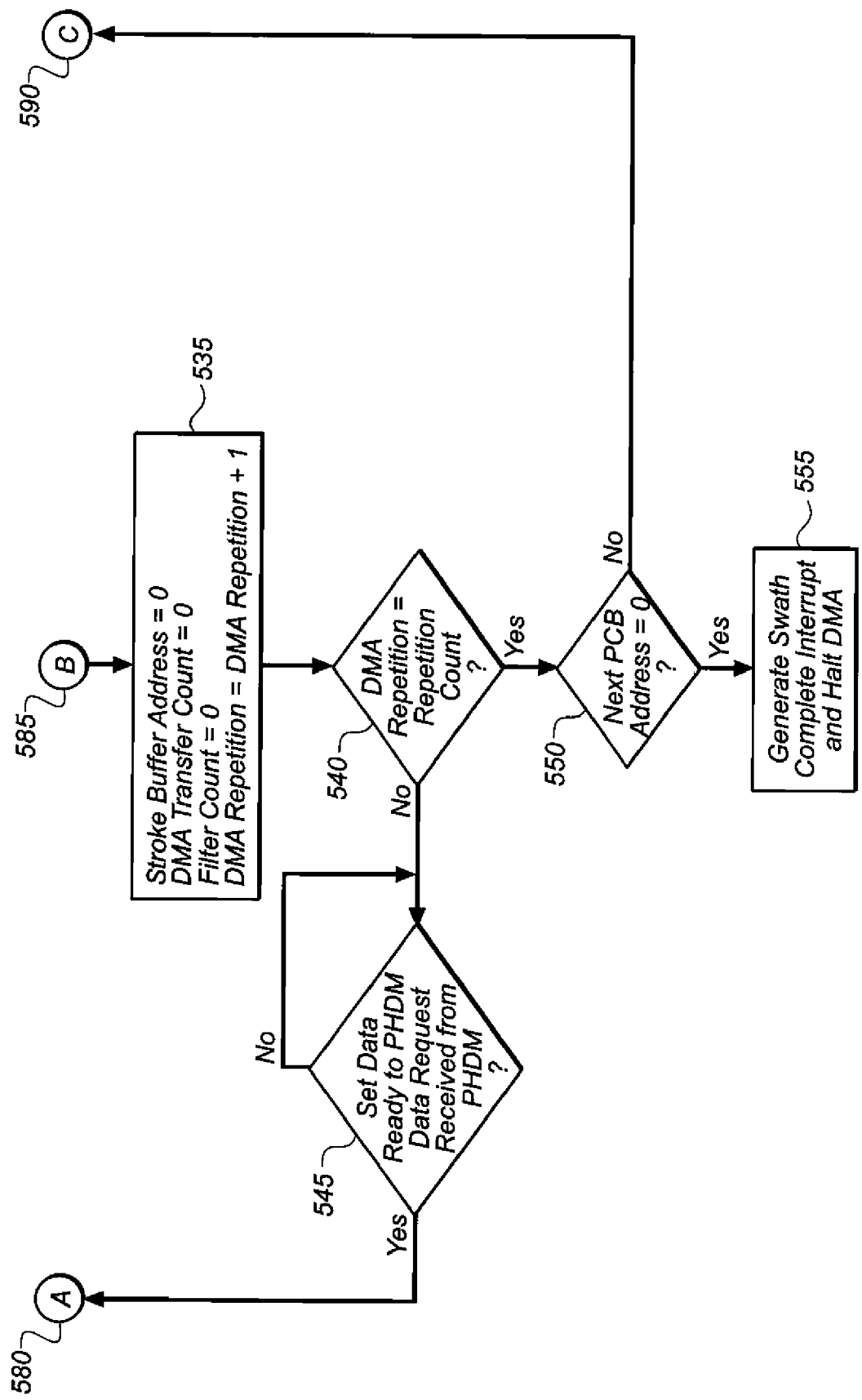

FIGS. 8A and 8B show a flow diagram for an embodiment of the Raster-To-Column DMA algorithm. (Items 580, 585 and 590 are not separate steps in the algorithm, but simply indicate how FIG. 5A links to FIG. 8B.) At step 510, the Initial Control Block Address is specified. At step 515, the Control Block is retrieved from SDRAM at the next Print Control Block address and initial DMA parameters are set up (including linage Buffer Base Address, Three Pass Filter Bit, Repetition Count, Address Increment, Three Pass Filter, and Next PCB Address). At step 520, internal registers are initialized. At step 525 a 32-bit word from SDRAM Image Data Buffer 420 is read at the Image Buffer Current Address. In addition, the filter is applied to selectively mask different image bits for multi-pass printing, and the result is stored in the stroke buffer 413 or 414. Also the DMA transfer count is incremented by 1.

At step 530, the transfer count is checked. If transfer count is not equal to 319, then step 525 is repeated. If transfer count equals 319, then the algorithm proceeds to step 535, where the stroke buffer address, DMA transfer count and filter count are reset to zero and the DMA repetition is incremented by 1. At step 540 the DMA repetition is checked to see if it equals repetition count. If yes at step 540, the algorithm proceeds to step 550 where it is checked to see whether the next Print Control Block address equals zero. If yes at step 550, then at step 555 an interrupt is generated to indicate that the swath is complete and the DMA is halted. If no at step 540, then a Data Ready signal is sent to PHDM 430 and it is checked to see whether a Data Request has been received from PHDM 430. If no at step 540, then step 540 is repeated. If yes at step 540, then the algorithm goes back to step 520, Also, if no at step 550, the algorithm goes back to step 515.

Figure 9:
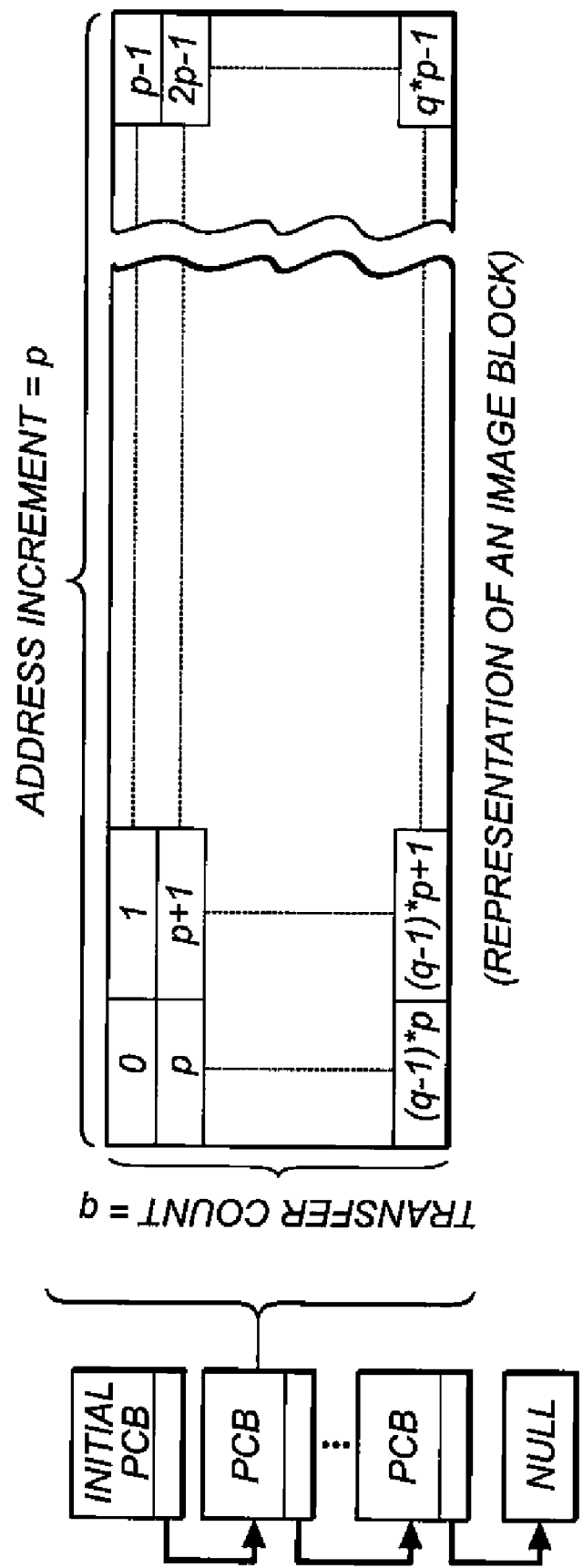
FIG. 9 schematically depicts the operation described in the flow diagram of FIGS. 8A and 8B.

A restriction implied by the algorithm illustrated in the flow diagram of FIGS. 8A and 8B is that individual rasters are contiguous in memory and that they are placed in memory in the same orientation regardless of print direction (i.e. raster is always left to night, left justified). The placement of the image on the page is controlled by the margin registers. This compensates for physical offsets between columns, including odd/even pixel offset, inter-die color column offsets and intra-die color column offsets. This is discussed in further detail below relative to the Encoder Control Module 440. FIG. 9 schematically depicts the operation described in the flow diagram of FIGS. 8A and 8B. The addresses in the cells shown in FIG. 9 are relative to the Buffer Base Address in the associated control block.

Printing of a partial raster buffer is accomplished by using the Buffer Base Address and Repetition Count within the control block. The Buffer Base Address identifies the leftmost portion of the raster to be printed while the Repetition Count identifies the relative rightmost portion of the raster to be printed.

Typically, a raster buffer region will be set up in SDRAM that can handle the longest raster possible for the printer configuration. Printing the full raster is straightforward; set the Address Increment as needed and the Repetition Count to (Address Increment-1). If it is decided that a middle portion is all that is required to print (e.g. for white space skipping), then placing the Buffer Base Address at a value pointing to the leftmost word effectively skips the raster buffer to the left of that address, while specifying the appropriate width via the Repetition Count will skip the raster buffer to the right.

For example, if one sets up a raster buffer in SDRAM that is sufficient to print a swath that is 8.0 inches wide, at 300 dots per inch the Address Increment would be 0x12C (75 double words provides 2400 pixels). To print only the portion between an index of 320 pixels (about 1 inch) from the left to and index of 1216 pixels (about 4 inches) from the right, the control block would be modified so that the Buffer Base Address is incremented by 10 (skip the first 10 double words, or 320 pixels) and the Repetition Count would be set to 26. The Repetition Count value is obtained by taking the maximum raster length (2400) and subtracting both the left and right offsets (320 and 1216, respectively), dividing the result by 32 (the number of bits in a double word, as defined by this architecture), and then subtracting one.

For either the Odd or Even Raster-To-Column DMA channel (411 and 412 respectively), the image data is stored in one of two 320 word by 32-bit Stroke Buffers A or B. While one stroke buffer A is being used for printing, the other stroke buffer B is being filled with new data to print by the Raster-To-Column DMA channel.

Printing of a partial raster buffer is accomplished by using the Buffer Base Address and Repetition Count within the control block. The Buffer Base Address identifies the leftmost portion of the raster to be printed while the Repetition Count identifies the relative rightmost portion of the raster to be printed.

The Print Head Driver Module (PHDM) 430 generates the print head firing signals using firing strobes generated by the Encoder Module 440 and image data from Stroke Buffers 413 and 414 filled by the Raster-To-Column DMA Controller 410. Each color print channel is enabled/disabled by odd and even print zones maintained by the Encoder Module 440. These print zones provide compensation for column offsets and channel offsets and are programmable via Margin Registers in the Encoder Module 440. The PHDM 430 extracts data from the Stroke Buffers 413 and 414 filled by the Raster-To-Column DMA Controller 410 and makes requests for new stroke buffers to be filled. Each time a Stroke Buffer is released by the PHDM 430, a request for a new Stroke Buffer is generated and the PHDM 430 switches to the previously filled alternate stroke buffer as follows:

In the PHDM 430, there are two Stroke Buffers A and B for each Print Head Channel. The size of each Stroke Buffer is 32 bits wide by the number of nozzles in the print head long (320 for the present example), which enables 32 strokes of printing per Stroke Buffer. When the PHDM 430 is ready to print from the Stroke Buffer, it expects a Stroke Buffer is always ready to print from. The Raster-To-Column DMA Controller Channel 410 indicates that a Stroke Buffer is ready for printing by asserting an active high "data ready" signal to the corresponding print head channel in the PHDM 430. If the data ready signal is not valid, the PHDM 430 generates the Data Error signal. This condition is indicated in the Print Status Register for each of the Raster-To-Column DMA Channels. In case of a data error, the PHDM 430 will continue to output print data at the programmed rate as if no data error has occurred. A data error condition signifies to the host system, that the Raster-To-Column DMA 410 is not running at a sufficient bandwidth to keep up with the data requirements of the PHDM 430.

If the data ready signal is valid, the PHDM 430 generates a Data Request Pulse (Active High for one Clock period). This triggers the Raster-To-Column DMA Channel to perform a Stroke Buffer switch. Thus, Stroke Buffer B is used for DMA filling while the released Stroke Buffer A is used for 32 strokes of printing. When the PHDM 430 is done using Stroke Buffer A for printing, this buffer switch process is repeated, this time releasing Stroke Buffer B for printing and using Stroke Buffer A for DMA filling ("ping-ponging"). Each time this buffer switch occurs, the PHDM 430 determines if the data ready signal is valid. If so, the PHDM 430 generates the active Data Request Pulse to the Raster-To-Column DMA Controller 410 to perform a buffer switch. Otherwise, the PHDM 430 generates the Data Error signal. The state of the Data Error signal is latched into a status register to be read by the host system and is reset to zero when this register is read by the host system.

The Data Error signal being set indicates that the Raster-To-Column DMA Controller 410 is not keeping up with the output bandwidth requirements for that Odd/Even channel. The DMA Controller's bandwidth is limited by the cycle time of the memory subsystem to which it is connected, and the number of DMA Channels that are active. For a tested embodiment, the cycle time of Raster-To-Column DMA controller's accesses to the SDRAM subsystem is approximately 200 ns to 220 ns per 32-bit word accessed. The following calculation approximates the maximum firing speed for this design using the assumptions above, for a particular case where six Odd and six Even Raster-To-Column DMA channels are connected to the SDRAM subsystem:

Firing Rate Max=1/((SDRAM cycle time)×(bets per stroke/32)×(number of Odd/Even channels))=1/((220 ns)×(640/32)×6)=approximately 37,878 firings per second. This bandwidth would accommodate a carriage speed of greater than 30 inches/second of printing performance at 1200 dots per inch along the carriage scan direction.

When the Start Print command is asserted, the PHDM 430 generates the command acknowledgement by checking the Data Ready signal for the active Raster-To-Column DMA channels and asserting the Data Request signal as discussed above. Then, the PHDM 430 will begin to output serial data, shift clock and fire pulse signaling according to the firing parameters setup in the PHDM Control Registers or Waveform Memory (i.e. firing clock frequency, fire pulse delay and fire pulse width settings). Two signals, Stroke Request and Print Zone N, indicate the stroke printing and the valid print margin of swath printing respectively for each print head Raster-To-Column DMA channel. Swath printing means printing from left margin to right margin or vice versa depending upon the printing direction. For an embodiment appropriate to a 640 jet printhead, stroke printing means printing jet 1 to jet 640 in ripple address order fashion as previously described. Thus, there are many stroke printings in one swath printing.

As previously described, there are Stroke Buffers in the Print Head Color Channel, two for each of the Odd DMA Print Channels and two for each of the Even DMA Print Channels. While one Stroke Buffer is accessed by the PHDM 430 for printing, the other is being filled, with new data from the Image Memory Buffer 420 (SDRAM), by the Raster-To-Column DMA Controller 410. This type of switching process is often referred to as "Ping-Ponging".

In one embodiment, the stroke buffer size is 32 bits wide by 512 bits long (a stroke length). Then 32 strokes of printing are done, for example with nozzle array 120 of printhead 100, using one stroke buffer. However, an entire length of the buffer may not be used depending upon the number of jets selected in the Number Of Jets Register. For instance, the buffer size for the exemplary 640 jet inkjet print head would be 320 odd jets and 320 even jets and the Number Of Jets Register is programmed to 319.

The output of print data from the Odd and Even Stroke Buffers 413 and 414 to the Print Head by the PHDM 430 is controlled by one additional parameter, Print Direction (PDIR). If the carriage 200 is moving from left to right, PDIR=0 and a stroke buffer provides a 32-bit block of stroke data (32×320) starting from the left side of the page and printing toward the right side of the page. If the carriage is moving from right to left, PDIR=1 and a stroke buffer provides a 32-bit block of stroke data starting from the right side of the page and printing toward the left side of the page. The PDIR parameter controls data bit selection out of the 32-bit data bus from the stroke buffer for a particular stroke printing. If the PDIR signal is programmed to "0", the Data Bit Mux Value which selects which of the 32-bits to use for this stroke is incremented from "00000" to "11111" for consecutive stroke printings. Once it is set to a number, 00000, for instance, the Data Bit Mux Value will remain constant for the rest of a stroke printing. When the stroke printing is done, the value is incremented from 00000 to 00001 and so on. When it reaches 1111, the PHDM 430 generates the Data Request signal to request another stroke buffer from the Raster-To-Column DMA Controller 410. If the Data Ready signal is active high, indicating that a fresh stroke buffer is ready, the Data Bit Mux value will start again from "00000" and increment to "11111" as described above while printing continues. Otherwise, the PHDM 430 will generate the Data Error as previously described. If the PDIR value is programmed to a "1", the Data Bit Mux Value is decremented from "1111" to "00000". Otherwise the data output process is similar.

Figure 10:
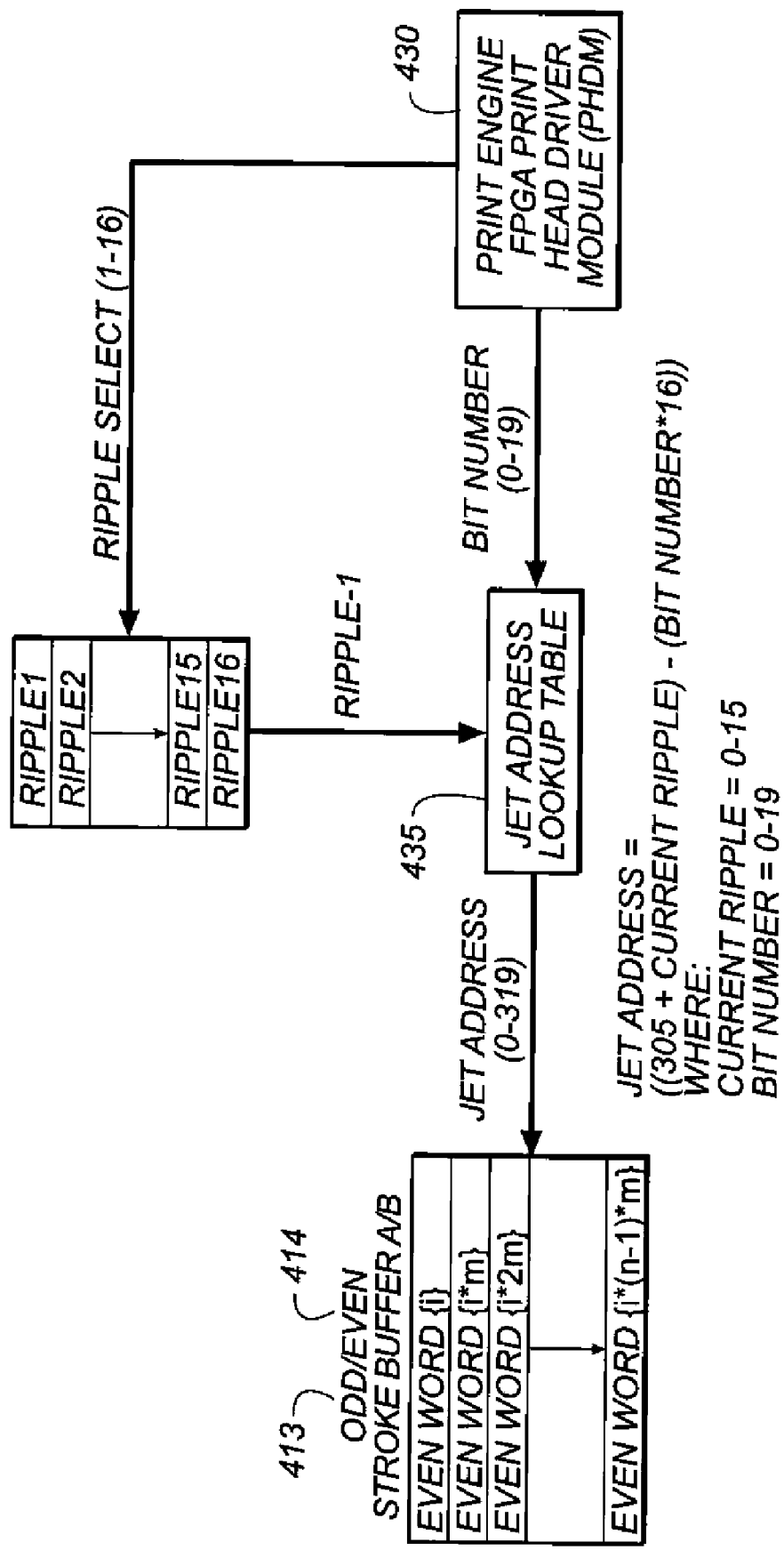
FIG. 10 shows the use of a lookup table for specifying jet firing order according to an embodiment of the invention.

Jet addressing within stroke printings, refers to the Odd or Even Stroke Buffer address necessary to select the bit order appropriate for the jet firing order. For the exemplary inkjet print head, this depends on the ripple firing address order programmed into the Ripple Address Order Registers. The programmed ripple address order must encode 16 unique ripple addresses in the range from 0-15 for proper operation of this logic. A logic based lookup table 435 is then used to select the appropriate Odd or Even Jet Bit Address in the Stroke Buffer 413 and 414, as illustrated schematically in FIG. 10.

For the exemplary inkjet print head having 640 jets per array:

Jet Address=((305+current ripple address)−(bit number*16)), where ripple address=0 to 15. Bit number is cycled from 0 to 19 in ascending order for each ripple address sequence. The corresponding jet nozzle number associated with each jet address is given by:

Odd Jet Number=((609+2*ripple address)−(bit number*16))

Even Jet Number=((610+2*ripple address)−(bit number*16))

Programmable ripple address firing order is implemented in the PHDM 430 by providing two registers for each color channel to encode the sequence of 16, 4-bit ripple addresses generated during a print head firing sequence. This ripple address order is used on all active channels to encode the Odd/Even Jet Address Lookup Tables for Stroke Buffer access during firing. The ripple addresses are input to the Jet Firing Order Lookup Table 435 in order to access the stroke firing data in a nonlinear order without having to reformat the data in the image buffer.

The Encoder Module 440 provides an interface for the encoder signals and generates a multiplied version of the stroke request firing strobe signal, for use in stroke firing timing. The Encoder Module 440 also provides programmable margins and independent print zone control for each Odd/Even Color channel 411 and 412 in Raster-To-Column DMA Controller 410. Encoder Module 440 is the mechanism that compensates for physical column offsets in the print head assembly without having to skew the image data in memory by re-formatting that data.

The carriage encoder circuit produces a quadrature encoder pulse train (see FIG. 11) consisting of a channel A signal 442 and a channel B signal 444, which are approximately 90 degrees out of phase. These two inputs are fed into logic in the Encoder Module 440. To enable use of lower resolution encoder fences (typically 150 lines per inch) for printing applications up to 2400 dots per inch and beyond, an encoder multiplication capability is included. The encoder multiplication logic generates multiple encoder pulses in multiplied encoder signal 446 from each Channel A encoder pulse period using the programming of an Encoder Multiplier Register which defines the native resolution in terms of the encoder strip markings multiplication factor. So, for example, if the encoder strip was graduated with 150 lines per inch, then the Encoder Multiplier for 1200 dot per inch printing would be 8.

The quadrature encoder signal 448 is derived from the carriage encoder channel A and channel B signals. A quadrature encoder pulse is generated on every rising and falling edge of either channel A or channel B. Carriage motion direction is also obtained by observation of which channel leads. If channel B goes high after channel A, then the carriage movement is positive. If channel A goes high after channel B, then the carriage movement is negative. The direction information is used in tracking the position of the carriage.

When using the Encoder Module 440 to generate the Stroke Requests to fire the print head 100, the Margin Registers are used to automatically compensate for print head odd/even offset and column offsets and color channel offsets. This is done by delaying the output of print data from a given channel's stroke buffer until such time as the margin (offset from start of image) is satisfied. This feature is essential in printing applications using the Raster-To-Column DMA Controller 410, because the raster image color planes as well as the odd and even data bits, do not have to be shifted in Image Buffer Memory to compensate for odd/even offset, inter-die color channel offset and intra-die offsets in the Print Head physical layout. How this is done is dependent upon the Encoder Module 440 configuration as well as the Printing Direction.

In order to use the Margin Registers, the carriage position must be tracked. This is done by the Encoder Module 440 counting encoder strip graduations and tabulating the count in a Carriage Position Register. The Carriage Position Counter counts up when the printer carriage is moving from right to left and counts down when the carriage is moving left to right. Thus an absolute position of the carriage can be maintained if this counter is set to a known value at the carriage "HOME" position. Then Margin Registers, one for each odd/even sub-channel times the total number of color channels can be used to instruct the PHDM 430 when to request strokes for that channel. The carriage position counter can be read at any time by the application software to determine the carriage location. The value indicates how far the carriage has moved and the direction of motion. The value is in the encoder resolution units, typically 150 lines per inch. If the counter decrements below zero, the counter will roll to 0xFFFF (the value is unsigned). If the counter increments to 0xFFFF, it will roll to 0. Additionally, it can be initialized to a given value by writing. Initialization should only be performed when the carriage is not moving.

Referring back to FIGS. 3 and 4, if the printhead is being scanned in carriage scan direction 60 that is right to left in the view of FIG. 4, then Color 1 odd jets should be fired first in order to make dots at a particular location on the media. Color 1 even jets need to be delayed by a number of pixel spacings equivalent to the column offset in order to register the dots from the even jets with the odd jets. Similarly, Color 2 odd jets need to be delayed relative to Color 1 odd jets by a number of pixel spacings equivalent to the intra-die channel offset. Similarly Color 3 odd jets need to be delayed relative to Color 1 odd jets by a number of pixel spacings equivalent to the sum of the intra-die channel offset and the inter-die channel offset.

By providing a Margin Register for each Color channel odd jets and another for each Color channel even jets, the offset for each from the start of the image relative to the encoder strip can be specified. Since each color channel and each odd/even sub-channel runs independently, these Margin Registers can then be used to delay the DMA Requests to a given channel to the appropriate position on the page.

The coarse margins are loaded by the applications software prior to performing swath based encoder printing. The coarse margins are 16-bit binary numbers that tell the PHDM 430 at which carriage positions (carriage position counter value) to begin printing for each active channel. The coarse and fine margin registers are used to compensate for odd/even print column offsets, inter-die color channel offsets and intra-die color channel offsets.

The carriage position counter is a 16-bit up/down counter in the encoder module 440 that increments and decrements as the carriage moves. Whether the counter increments or decrements, depends on the quadrature decoded direction of the carriage encoder signals.

The fine margins relate to the multiplied encoder pulse within the carriage encoder pulse. As described above, for every carriage encoder pulse, multiple encoder pulses are generated. The fine margin informs the PHDM 430 at which one of the multiple generated encoder pulses to begin printing at, after the coarse margin value requirements have been met.

The invention has been described in detail with particular reference to certain preferred embodiments thereof, but it will be understood that variations and modifications can be effected within the spirit and scope of the invention.

PARTS LIST

| | |
|---|---|
| A, B | Image data columns |
| 1, 2 | Image data raster lines |
| 10 | Inkjet printer system |
| 12 | Image data source |
| 14 | Printer controller |
| 15 | Image processing unit |
| 16 | Electrical pulse source |
| 18 | First fluid source |
| 19 | Second fluid source |
| 20 | Recording medium |
| 50 | Image data |
| 52 | Swath |
| 60 | Carriage scan direction |
| 62 | Media advance direction |
| 100 | Ink jet printhead |
| 110 | Ink jet printhead die |
| 111 | Substrate |
| 120 | First nozzle array |
| 121 | Nozzle in first nozzle array |
| 122 | Ink delivery pathway for first nozzle array |
| 130 | Second nozzle array |
| 131 | Nozzle in second nozzle array |
| 132 | Ink delivery pathway for second nozzle array |
| 181 | Droplet ejected from first nozzle array |
| 182 | Droplet ejected from second nozzle array |
| 200 | Carriage |
| 250 | Printhead chassis |
| 251 | Printhead die |
| 253 | Nozzle array |
| 254 | Nozzle array direction |
| 256 | Encapsulant |
| 257 | Flex circuit |

-continued

PARTS LIST

| | |
|---|---|
| 258 | Connector board |
| 262 | Multichamber ink supply |
| 264 | Single chamber ink supply |
| 300 | Printer chassis |
| 302 | Paper load entry |
| 303 | Print region |
| 304 | Paper exit |
| 306 | Right side of printer chassis |
| 307 | Left side of printer chassis |
| 308 | Front portion of printer chassis |
| 309 | Rear portion of printer chassis |
| 310 | Hole for paper advance motor drive gear |
| 311 | Feed roller gear |
| 312 | Feed roller |
| 313 | Forward rotation of feed roller |
| 319 | Feed roller shaft |
| 320 | Pickup roller |
| 322 | Turn roller |
| 323 | Idler roller |
| 324 | Discharge roller |
| 325 | Star wheel |
| 330 | Maintenance station |
| 370 | Stack of media |
| 371 | Top sheet |
| 380 | Carriage motor |
| 382 | Carriage rail |
| 383 | Encoder fence |
| 384 | Belt |
| 390 | Printer electronics board |
| 392 | Cable connectors |
| 410 | Raster-to-column DMA controller |
| 411 | Odd DMA channel |
| 412 | Even DMA channel |
| 413 | Odd stroke buffers A and B |
| 414 | Even stroke buffers A and B |
| 420 | Image data buffer |
| 430 | Print head driver module |
| 440 | Encoder module |

What is claimed is:

1. A printing system for printing an image swath by swath according to image data that is provided to an image memory buffer in raster row format, the printing system comprising:

a printhead including a plurality of columns of marking elements, each column being disposed along an array direction and being spaced apart by an offset distance;

a carriage for moving the printhead in a carriage scan direction that is substantially perpendicular to the array direction;

an encoder to provide input on the location of the carriage along the carriage scan direction; and a printer controller for reformatting the image data that is provided to the image memory buffer in raster format and controlling the marking elements to print a swath of the image as the printhead is moved by the carriage in the carriage scan direction, the printer controller comprising:

a direct memory access controller portion for extracting data from the image memory buffer and rotating the image data from raster row format to column format;

a plurality of stroke buffers for receiving the rotated image data in column format from the direct memory access controller;

an encoder control portion for providing stroke firing strobe signals based on the input from the encoder; and a printhead driver control portion for generating rotated image data requests for the stroke buffers based on the input provided by the encoder and providing signals necessary to cause the marking elements to print according to the timing of the stroke firing strobe signals.

2. The printing system of claim 1, wherein the plurality of stroke buffers further comprises two stroke buffers corresponding to each column of marking elements in the printhead, the stroke buffers being configured such that one stroke buffer can be alternately filled with the rotated image data from the direct memory access controller while the other stroke buffer provides rotated image data to the printhead driver control portion.

3. The printing system of claim 1, wherein the encoder control portion includes a programmable register for controlling the output of data from the stroke buffers to the printhead driver control portion, such that firing timing compensates for the offset distance between columns of marking elements.

4. The printing system of claim 1, the rotated image data being arranged as a first color channel and a second color channel, the printhead including a first array of marking elements and a second array of marking elements, the first array of marking elements being configured to print the first color channel data and the second array of marking elements being configured to print the second color channel data, wherein the printer controller further comprises a direct memory access controller corresponding to each color channel.

5. The printing system of claim 4, the first array of marking elements including a first column and a second column that are spaced apart by a column offset distance, and the second array of marking elements including a first column and a second column, wherein the first column of the first array is offset from the first column of the second array by a channel offset, and the channel offset is larger than the column offset.

6. The printing system of claim 1, wherein the printer controller further comprises a look-up table and a register for providing a programmable firing order for the rotated image data in a stroke buffer.

7. The printing system of claim 1, a first column of marking elements being configured to print odd-numbered pixels in the swath and a second column of marking elements being configured to print even-numbered pixels in the swath, wherein the direct memory access controller includes a first channel corresponding to the first column and a second channel corresponding to the second column.

8. The printing system of claim 1, wherein the number of marking elements in a column is N, and the size of the stroke buffer corresponding to that column is m×N, so that m strokes of printing are enabled by the stroke buffer.

9. The printing system of claim 1, wherein the bandwidth of the direct memory access controller is sufficient to accommodate a carriage speed of 30 inches per second while the marking elements are printing at 1200 dots per inch along the carriage scan direction.

10. The printing system of claim 1, wherein the printhead is an inkjet printhead.

11. A method for controlling swath printing of an image by columns of marking elements on a printhead, each column being disposed along an array direction and being spaced apart by an offset distance, as the printhead is moved at a scan speed along a scan direction, the image being printed according to image data that is provided in raster row format, said method comprising:
moving the printhead in a carriage scan direction that is substantially perpendicular to the array direction;
receiving an input, via an encoder, to provide on the location of the carriage along the carriage scan direction;
storing the image data in raster row format in an image memory buffer;
extracting the image data from the image memory buffer and rotating the image data from raster row format to column format by a direct memory access controller;
transferring the image data in column format from the direct memory access controller to a plurality of stroke buffers;
generating stroke firing strobe signals by an encoder control portion based on the input from the encoder;
providing the signals to the printhead driver control portion;
providing the image data in column format from the stroke buffers to the printhead driver control portion; and
sending signals from the printhead driver control portion to the printhead to cause the marking elements to print according to the timing of the stroke firing strobe signals as the printhead is moved along the scan direction.

12. The method according to claim 11, wherein the steps of transferring the rotated image data to the plurality of stroke buffers and providing the rotated image data from the stroke buffers to the printhead driver control portion further comprises the step of:
alternatingly filling a first stroke buffer with the rotated image data from the direct memory access controller while a second stroke buffer provides the rotated image data to the printhead driver control portion.

13. The method according to claim 11, wherein the step of generating stroke firing strobe signals by the encoder control portion further comprises:
controlling the output of data from the stroke buffers using a programmable register, so that firing timing compensates for the offset distance between columns of marking elements.

14. The method according to claim 11 further comprises the step of:
using a look-up table and a register to provide a programmable firing order for the data in a stroke buffer.

15. The method according to claim 1, wherein the step of sending signals from the printhead driver control portion further comprises sending signals for printing by the marking elements at a high enough rate to print at 1200 dots per inch along the scan direction at a scan speed of greater than 30 inches per second.

16. A raster-to-swath image data converter device for controlling the printing of image information provided in raster row format by a plurality of columns of marking elements that will print in columns an image swath by swath according to image data that is provided to an image memory buffer in raster row format, the converter device comprising:
an encoder to provide input on the location of the columns of marking elements; and
a printer controller for reformatting the image data that is provided to the image memory buffer in raster row format and controlling the marking elements to print a swath of the image as the marking elements are moved relative to the encoder, the printer controller comprising:
a direct memory access controller portion for extracting the image data from the image memory buffer and rotating the image data from raster row format to column format;
a plurality of stroke buffers for receiving the image data in column format from the direct memory access controller;
an encoder control portion for providing stroke firing strobe signals based on the input from the encoder; and
a marking element driver control portion for generating data requests from the stroke buffers based on the input provided by the encoder and providing signals necessary to cause the marking elements to print according to the timing of the stroke firing strobe signals.

17. The image data converter of claim 16, wherein the encoder control portion includes a programmable register for controlling the output of data from the stroke buffers to the marking element driver control portion, such that firing timing compensates for the offset distance between columns of marking elements.

18. The image data converter of claim 16, wherein the printer controller further comprises a look-up table and a register for providing a programmable firing order for the data in a stroke buffer.

19. The image data converter of claim 16, a first column of marking elements being configured to print odd-numbered pixels in the swath and a second column of marking elements being configured to print even-numbered pixels in the swath, wherein the direct memory access controller includes a first channel corresponding to the first column and a second channel corresponding to the second column.

20. The image data converter of claim 16, wherein the number of marking elements in a column is N, and the size of the stroke buffer corresponding to that column is m×N, so that m strokes of printing are enabled by the stroke buffer.

* * * * *